(12) United States Patent
Arlein et al.

(10) Patent No.: US 7,107,269 B2
(45) Date of Patent: Sep. 12, 2006

(54) METHODS AND APPARATUS FOR PROVIDING PRIVACY-PRESERVING GLOBAL CUSTOMIZATION

(75) Inventors: Robert M. Arlein, Maplewood, NJ (US); Ben Jai, Scotch Plains, NJ (US); Bjorn Markus Jakobsson, Hoboken, NJ (US); Fabian Monrose, New York, NY (US); Michael Kendrick Reiter, Raritan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 525 days.

(21) Appl. No.: 10/031,773

(22) PCT Filed: Jun. 12, 2001

(86) PCT No.: PCT/US01/18959

§ 371 (c)(1),
(2), (4) Date: Jan. 23, 2002

(87) PCT Pub. No.: WO01/97074

PCT Pub. Date: Dec. 20, 2001

(65) Prior Publication Data

US 2002/0133500 A1 Sep. 19, 2002

Related U.S. Application Data

(60) Provisional application No. 60/211,164, filed on Jun. 13, 2000.

(51) Int. Cl.
*G06F 17/30* (2006.01)

(52) U.S. Cl. .............................. 707/9; 707/10; 709/203; 709/219; 705/26

(58) Field of Classification Search .................... 707/9, 707/10, 102, 104.1; 709/203, 219, 215, 225; 705/26; 713/171
See application file for complete search history.

(56) References Cited

U.S. PATENT DOCUMENTS

| 5,347,632 | A | | 9/1994 | Filepp et al. |
| 6,014,638 | A | | 1/2000 | Burge et al. |
| 6,018,724 | A | | 1/2000 | Arent |
| 6,026,374 | A | | 2/2000 | Chess |
| 6,035,288 | A | | 3/2000 | Solomon |
| 6,064,980 | A | * | 5/2000 | Jacobi et al. .................. 705/26 |

(Continued)

FOREIGN PATENT DOCUMENTS

EP 0 917 119 A 5/1999

(Continued)

*Primary Examiner*—Leslie Wong

(57) ABSTRACT

Techniques and infrastructure are provided for supporting global customization. The invention enables persona profiles of user information to be maintained, and such persona profiles to be accessed by merchants. Via the persona abstraction, users control what information is grouped into a persona profile, and can selectively enable a merchant to read one of these profiles. The infrastructure of the invention employs a persona server that assists users in managing their personae. The infrastructure of the invention separates this from the profile databases at which persona profile information is stored, to eliminate any single point at which different persona profiles can be tied to the same user. Since merchants also have privacy concerns, the infrastructure of the invention provides a data protection model based on tainting, by which merchants can limit how the information they contribute can be exposed.

16 Claims, 7 Drawing Sheets

| FIELD | TYPE |
|---|---|
| 508 — INFO: EGYPT | STRING |
| 510 — STR: | INTEGER |
| 506 — TAINTED BY: $A_1 ... A_n$ | POINTERS TO RECORDS |
| 502 — ATS: max (STR, ATS($A_1$), ... ,ATS($A_n$)) | INTEGER |
| 504 { CLASS[0]: (friends) | SET OF MERCHANTS |
| ⋮ | ⋮ |
| CLASS[STR]: (enemies) | SET OF MERCHANTS |

U.S. PATENT DOCUMENTS

| | | | |
|---|---|---|---|
| 6,161,139 A * | 12/2000 | Win et al. | 709/225 |
| 6,182,124 B1 * | 1/2001 | Lau et al. | 709/217 |
| 6,199,099 B1 * | 3/2001 | Gershman et al. | 709/203 |
| 6,219,667 B1 * | 4/2001 | Lu et al. | 707/9 |
| 6,477,509 B1 * | 11/2002 | Hammons et al. | 705/27 |
| 2001/0014868 A1 * | 8/2001 | Herz et al. | 705/14 |
| 2004/0199765 A1 * | 10/2004 | Kohane et al. | 713/165 |

FOREIGN PATENT DOCUMENTS

| | | |
|---|---|---|
| EP | 0 986 016 A | 3/2000 |
| EP | 01 94 6302 | 12/2005 |
| WO | WO 00/14648 A | 3/2000 |
| WO | WO 00/31657 A | 6/2000 |

* cited by examiner

FIG. 5
| FIELD | TYPE |
|---|---|
| 508 — INFO: EGYPT | STRING |
| 510 — STR: | INTEGER |
| 506 — TAINTED BY: $A_1 \ldots A_n$ | POINTERS TO RECORDS |
| 502 — ATS: max (STR, ATS($A_1$), ... , ATS($A_n$)) | INTEGER |
| 504 { CLASS[0]: (friends) | SET OF MERCHANTS |
| ⋮ | ⋮ |
| CLASS[STR]: (enemies) | SET OF MERCHANTS |
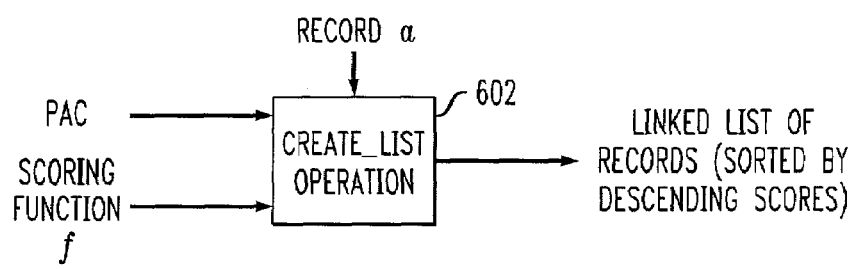
FIG. 6A
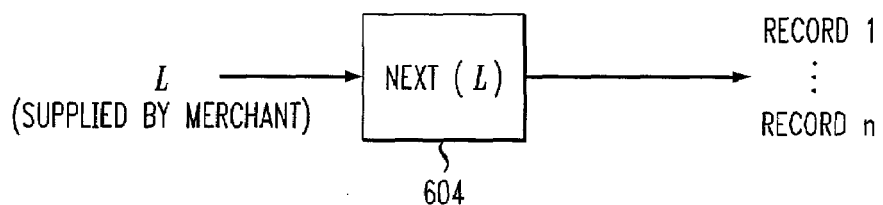
FIG. 6B

METHODS AND APPARATUS FOR PROVIDING PRIVACY-PRESERVING GLOBAL CUSTOMIZATION

CROSS-REFERENCE TO RELATED APPLICATIONS

This application claims priority to the U.S. provisional patent application identified by Ser. No. 60/211,164, filed on Jun. 13, 2000, and entitled "Privacy-Preserving Global Customization," the disclosure of which is incorporated by reference herein.

FIELD OF THE INVENTION

The present invention relates to global customization of network content and, more particularly, to global customization of network content with privacy mechanisms such that a user may control what information a merchant can learn about the user's activity at other merchants, and a merchant may control what information is revealed to competing merchants.

BACKGROUND OF THE INVENTION

With the increasing user acceptance of performing purchasing transactions over a data network, such as the World Wide Web (hereinafter "web") or the Internet, merchants who host web sites at which users may purchase (or, at least, learn about) their products have an obvious financial interest in continuously attempting to improve the user's experience. Mass customization refers to the creation of a customized experience for online buyers by using technology that responds to their individual requirements and interests, see, e.g., J. Nelson, "Mass-Customization Marketing: Maximizing Value of Customers," IDC Bulletin #17726, December 1998, the disclosure of which is incorporated by reference herein. "Customization" is sometimes also called "personalization," though personalization also conveys the meaning of web content that the user can explicitly configure. For example, a user might create a personalized web page at a site by telling the site which stock quotes to display whenever the user visits. Here, we are primarily concerned with content that a site predicts the user will like based on information inferred about the user, rather than by explicit user instruction. Customization typically employs data mining and/or collaborative filtering to predict content that is likely to be of interest to that visitor, and presentation of customized content to the visitor at opportune moments. Customization can be particularly effective when the user identifies himself or herself explicitly to the web site. In this case, customization can be much more "accurate," in the sense that the site can employ the specific user's past browsing and purchasing history at that site to predict what content will be most effective for this user.

Global customization, by which a user's web history is shared across many merchant sites, is practiced today in several forms. A predominant form of such global customization is "ad networks" such as DoubleClick™. In this form, information about a visitor's activities at a merchant site is passed to DoubleClick™ via image hypertext links in the merchant's page. In response to these requests, DoubleClick™ returns banner advertisements customized to these activities. This customization is "global" in that this information is collected into a profile for the user (or more precisely, the browser) that is used to customize ads for the same user on his or her future visits to DoubleClick™-enabled sites.

Recently, even more ambitious sharing of consumer web activity has been developed by companies such as Angara™ and I-behavior™ (or Net Perception™). Both companies profile users, Angara using an opt-out approach and I-behavior using an opt-in approach, and provide targeted information to merchants about a user for the purposes of customization. However, none of these existing approaches provide support for users and merchants to specify policies that limit who can obtain information they contribute.

Further, electronic wallets, such as the Microsoft Passport™ and the Java Wallet™, may offer possibilities for global customization. Wallets vary with respect to what information they retain about user activities, and to what extent they share this information with participating merchants. However, to the extent that they do retain information (for example, they often retain receipts for purchases), such wallets pose a privacy risk to both users and merchants. From the user perspective, these wallets hold identifying information for the user in conjunction with any behavioral information, and, therefore, stored behavioral profiles are not anonymous. Moreover, to the extent that behavioral information is conveyed to merchants, merchants are unable to specify data protection policies about how information they contribute is to be shared with others. The above-mentioned privacy risks have been cited as a major tension between wallet vendors and both online merchants and users; see, e.g., K. Cassar et al., "Digital Wallets, Pursuing Dual Wallet Strategy Before Leverage is Lost," Jupiter Strategic Planning Services/DCS99-14, February 1999, the disclosure of which is incorporated by reference herein.

Still further, pseudonymous e-mail addresses, or "nyms," are known to be used in e-mail applications, see, e.g., D. Maziéres et al., "The design, implementation, and operation of an email pseudonym server," Proceedings of the 5th ACM Conference on Computer and Communication Security, pages 27–36, November 1998; and I. Goldberg et al., "Freedom Network 1.0 architecture," November 1999, the disclosures of which are incorporated by reference herein. Users post to newsgroups or send emails under a nym in a way that recipients may not easily be able to correlate multiple nyms as being the same user. However, nyms do not provide mechanisms and support for users and merchants to specify policies that limit who can obtain information they contribute such that global customization of network content may be performed in a sufficiently privacy-preserving manner.

SUMMARY OF THE INVENTION

The present invention provides techniques for global customization of network content with privacy mechanisms such that, in one aspect of the invention, a user may control what information an entity can learn about the user's activity at other entities, and, in another aspect of the invention, a particular entity may control what information is revealed to competing entities. In a preferred embodiment of the invention, the entities are merchants.

Accordingly, the inventive techniques enable global profiles of each user's behavior to be maintained, so that a merchant can customize content for a user based on that user's activities, even at other merchants. At the same time, however, the techniques are privacy-preserving, in the sense that users and merchants can control how information about them is shared. Specifically, the inventive techniques enable each user to control which of his or her information can be gathered together in a profile, and does so with natural extensions to the user's browsing experience. It also enables each merchant to specify which other merchants can learn the information that it contributes to a profile and/or other information derived therefrom. As mentioned above, existing approaches lack such data protection models.

To this end, in accordance with one aspect of the invention, the present invention protects a user by employing the abstraction of a "persona," or a role, as will be explained in detail below, in which a user conducts web activity. A user can have many personae, with the property that only the user's activities undertaken while in a given persona can be linked in a profile. This gives the user a convenient and natural way to partition information about himself or herself into persona profiles that she can selectively reveal. For example, a user may create one persona for work, one for recreation, and one for when his or her children use the browser.

Further, in accordance with another aspect of the invention, the present invention protects entities such as merchants by employing a powerful protection model based on "tainting," as will be explained in detail below, which offers fine-grained control over not only which merchants can access the records they reveal about their customers, but also which merchants can access information derived from those records. This gives merchants the ability to specify different gradations of access control for partners, competitors, and others.

In accordance with the principles of the present invention, consider the following example of the type of capabilities that may be realized based on the inventive teachings provided herein. Suppose a user purchases a ticket to Egypt at a travel web site. Later, the consumer visits an online bookstore, which learns of the consumer's interests in travel and Egypt via the techniques of the present invention. The site thus customizes its pages based on this information, highlighting books about the pyramids, tours and travel in Egypt, etc. When the consumer visits an online electronics store, the entry page highlights their new Egyptian-to-English electronic pocket translator, and so on. However, at any point, the user can switch to a different persona profile that reflects nothing about these activities, and so this information will not be conveyed to sites the user subsequently visits. Moreover, the book store can specify that records it contributes to the profile (e.g., that the user bought books about Egyptian art) not be made available to other book stores, since these competing book stores could use this information to gain this user as a customer.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 5 is a diagram illustrating a data structure stored with a record according to an embodiment of the present invention;

FIGS. 6A and 6B are diagrams respectively illustrating record reading operations supported by a profile database according to an embodiment of the present invention;

DETAILED DESCRIPTION OF PREFERRED EMBODIMENTS

Figure 1:
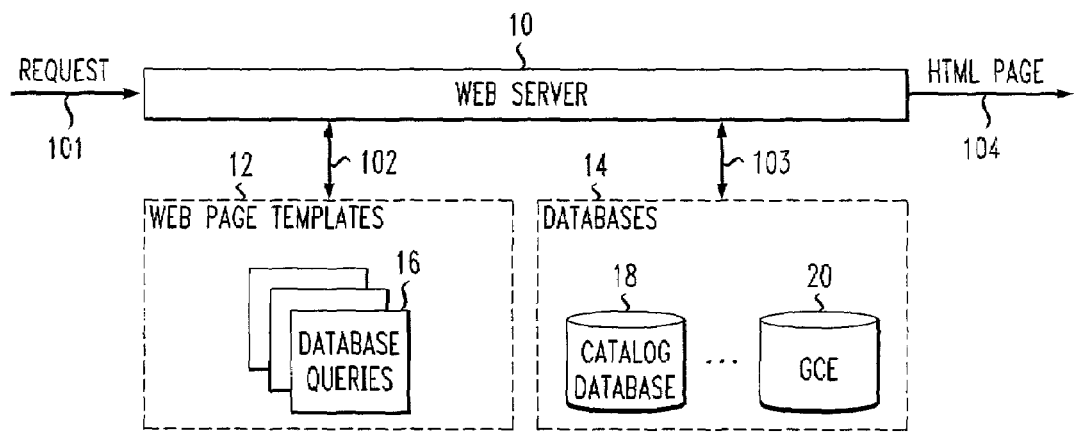
FIG. 1 is a block diagram illustrating a commerce server system, e.g., a server system which runs a merchant's web site, according to an embodiment of the present invention.

The present invention will be explained below in the context of the World Wide Web, or the Internet, wherein users (in accordance with browsing software running on their respective computer systems) are able to visit merchant web sites (running on one or more respective servers) in order to browse and/or buy products, services, etc. However, it is to be understood that the present invention is not so limited. Rather, the methodologies and infrastructure of the invention may be more generally applied to any distributed network environment wherein users are able to visit sites hosted by respective entities and wherein it is desirable for the users and/or entities to have and use mechanisms that preserve their respective privacy, at their own discretion, within the context of global customization.

In order to facilitate reference to certain aspects of the invention, the remainder of the detailed description is divided into the following sections: (I) Abstractions; (II) Infrastructure; (III) Personae Management; (IV) Data Sharing Among Merchants; (V) Illustrative Applications; and (VI) Exemplary Computer System Architecture. Also, for further ease of reference, certain of these sections are, themselves, divided into subsections.

I. Abstractions

In this section, we describe the abstractions the present invention offers to merchants and users, as well as certain exemplary advantages that are realized therefrom.

First, it is to be understood that the techniques of the present invention do not limit the collection of information that already takes place today on the web. Preventing data collection by technical means is the topic of numerous other research and commercial projects in anonymous or pseudonymous web access, see, e.g., M. Reed et al., "Anonymous connections and onion routing," IEEE Journal on Selected Areas in Communication 16(4):482–494, May 1998; M. K. Reiter et al., "Crowds: Anonymity for web transactions," ACM Transactions on Information and System Security 1(1):66–92, November 1998; E. Gabber et al., "On secure and pseudonymous client-relationships with multiple servers," ACM Transactions on Information and System Security 2(4):390–415, November 1999; and I. Goldberg et al., "Freedom Network 1.0 architecture," November 1999, the disclosures of which are incorporated by reference herein. The present invention may be considered as complementing this research by providing techniques for controlled information sharing that are compatible with existing web infrastructure and even with anonymous web access, e.g., as implemented by the aforementioned anonymizing systems. Most anonymizing systems can be configured to remove HTTP (HyperText Transport Protocol) cookies from traffic between the browser and web sites. Since, as will be explained, the present invention may preferably employ cookies, the present invention is compatible with these anonymizing systems when they are configured to not remove cookies. If cookies are not available for use, either due to an anonymizing system or because the user has disabled their use in his or her browser, then the inventive techniques will have no effect and will be invisible to him or her.

Similarly, the techniques of the present invention do not include preventing various privacy attacks that, e.g., enable a web site to directly observe a user's activity at other web sites, see, e.g., E. W. Felten et al., "Web spoofing: An Internet con game," Proceedings of the 20th National Information Systems Security Conference, October 1997, the disclosure of which is incorporated by reference herein. The same measures and precautions against such attacks may be applied by users of the inventive infrastructure.

Second, it is to be understood that the techniques of the present invention do not prevent merchants from sharing information outside the inventive infrastructure. Rather than trying to force the adoption of such infrastructure by eliminating alternatives to it, the invention offers a more publicly acceptable and valuable infrastructure to enable sharing. As a result, the threats we consider do not admit collaborative misbehavior by merchants to convey more information among themselves than is allowed by the policies of the invention. Merchants could always convey that information outside the infrastructure, and indeed risk being detected if they misuse the infrastructure for that purpose. Auditing compliance with the policies of the invention is discussed below. That said, the invention provides little or no help to merchants who attempt to share data outside the infrastructure.

Accordingly, the invention enables each user to partition behavioral record-keeping by merchants into several personae profiles that are unlinkable to those components that possess them, and to control which persona profile is exposed to each merchant. This is accomplished by separating storage of persona profiles from the ability to link those persona profiles to a single user. For merchants that contribute information to persona profiles, the invention provides a protection model for the merchant to control what other merchants can benefit from those records. It is to be appreciated that these features and advantages may be realized without changing existing web infrastructure, e.g., without the use of custom client-side software (in contrast to, e.g., the Java wallet).

In order to prevent abuse of the infrastructure of the invention, auditing may be performed in order to detect (and, thus, discourage) forms of abuse that cannot be inherently prevented, or the charging of models may be implemented in order to motivate merchants to behave appropriately. For example, since merchants sharing data outside the inventive infrastructure may not necessarily be prevented, merchants may be subject to an audit by an organization like TRUSTe or BBBOnline as a condition of using the inventive infrastructure. Other behavior that can be audited is the accuracy of records that merchants contribute to a persona profile, though doing so requires a different form of audit, i.e., active probing. To conduct this form of audit, an auditing agency may play the role of a user who visits the merchant and conducts some transaction. Afterward, the records the merchant contributed may be examined for accuracy. To motivate merchants to contribute records at all, a price charged to merchants may be made inversely proportional to the number of records they contribute.

(a) The User's Perspective

As mentioned above, an abstraction that the invention provides to the user is that of having the ability to have multiple personae. A persona represents a role in which the user engages in web activity. Examples of personae may be, but not limited to, "work," "entertainment," "medical," "shopping," "investing," etc. The relevant feature of a persona is that activities undertaken by the user while acting in a given persona can be linked and profiled across sites. So, if a user visits two different sites under a "work" persona, then information about the user's activities undertaken at each site are available to the other site, provided that both sites allow this. However, if the user visits a site under a "work" persona, then the user need not fear that his or her "entertainment" activities will become known to that site.

It is to be understood that while the terms "persona" and "persona profile" may occasionally be used interchangeably herein, more specifically, a persona represents a role a user engages in during network activities and a persona profile is a set of information accumulated in association with a given persona. In some cases, the term "profile" is used wherein, from its context, it is understood to refer to a profile associated with a persona, as opposed to a user profile.

Because it is intrinsically difficult to prevent the correlation of two personae of the same user at a single site—e.g., the two personae could be linked based on IP (Internet Protocol) address or even browsing behavior—by default, the invention allows a merchant to read the profile of only one persona per user. This is achieved by granting read credentials to a merchant for only that persona. For a different persona employed by the user on a subsequent visit to that site, the merchant is not given credentials to read that persona's profile. However, the merchant may still be given credentials to contribute records to this different persona, if the user permits.

Users may configure personae on various parameters, which will be described below in Section III. A user selects a persona when a site requests a persona and one has not already been selected by the user for this browsing session. An exemplary interface by which the user conducts this selection is also described below in Section III. A preferred technique of the invention is opt-in, i.e., the interface is not presented to the user unless the user previously enrolled his or her browser to receive persona requests, and at any point the user may disable a persona and later re-enable it via a simple interface. It is important that users be able to understand and set the policies associated with personae, and to easily switch between personae when appropriate. A preferred implementation of the present invention is constructed with such considerations in mind.

(b) The Merchant's Perspective

FIG. 1 is used to illustrate a merchant's perspective with respect to an abstraction used to preserve privacy while enabling global customization in accordance with the invention. Specifically, FIG. 1 shows a simplified architecture of a commerce server system, e.g., a server system which runs a merchant's web site, according to an embodiment of the present invention. It is known that commerce servers are often constructed using database-driven templates that enable the dynamic creation of web pages. By way of example, G. W. Treese et al. "Designing Systems for Internet Commerce," Addison-Wesley, Reading, Mass., 1998, the disclosure of which is incorporated by reference herein, describes techniques for designing systems used in Internet commerce. Such web page templates are written in a template language and stored in the web server file system. An exemplary web server file system, such as a commerce server system, is illustrated in FIG. 1. In particular, the system shows a web server 10, web page templates 12 and databases 14. As is known, the template language offers primitives for posing queries 16 to the databases 14, performing computation, and rendering HTML (HyperText Markup Language). Thus, generally, when the web page is requested (step 101), the web page template is interpreted to render a web page (step 102) based on information retrieved from the databases 14 in accordance with a catalog database 18 (part of step 103).

Advantageously, as shown in FIG. 1, the present invention augments a commerce server file system with another "database" per merchant, called a Global Customization Engine (GCE) 20. Conceptually, the GCE serves as another database that web page templates 12 can query. However, rather than being a database of only local information, the GCE interacts with remote components of the infrastructure of the invention (e.g., profile databases or PDBs, as will be explained in detail below) to obtain web history information about (the persona of) a visitor to this site and to contribute information about this visitor. Web page templates 12 query the GCE 20 (part of step 103) for information about the visitor, and they or other components (e.g., Common Gateway Interface or CGI scripts) insert records about this persona at the GCE (also part of step 103). The GCE may propagate these records to other components of the infrastructure of the invention and eventually to other merchants, as will be explained below.

An interface between the merchant site and the GCE enables the merchant site to register an identifier of the merchant's choice along with a "persona access credential" (PAC) that is passed to the merchant site if the user's persona management policy allows. From then onward (until the PAC expires), web page templates can query the GCE using the chosen identifier. The GCE uses the PAC to retrieve information from the infrastructure of the invention about the persona associated with the corresponding PAC. The PAC also enables the merchant to contribute information about the visitor to the infrastructure of the invention. When the merchant site inserts records at the GCE, the merchant specifies access control information that constrains what other merchants can read these records or records derived from them. An illustrative data protection model for accomplishing this aspect of the invention will be described below in further detail in Section IV.

In one preferred embodiment of the invention, a GCE may be integrated with a commercial commerce server such as an iMerchant Pro 2.0 (made by Premium Hosting Services, Inc.). The illustrative commerce server supports a web page template language called iHTML, via which web pages pose queries to the GCE. In such an embodiment, the merchant registers a PAC with a customer identifier that it also sets as an HTTP cookie in the user's browser for the current browsing session. In this way, when the site gets an HTTP request from that user, it can pass the associated cookie to the GCE to obtain information about the (persona of the) visitor.

II. Infrastructure

In this section, we describe an illustrative overview of an infrastructure of the invention according to an embodiment of the invention, in the context of FIG. 2, which supports the interfaces mentioned above in Section I and which will be further described below.

Figure 2:
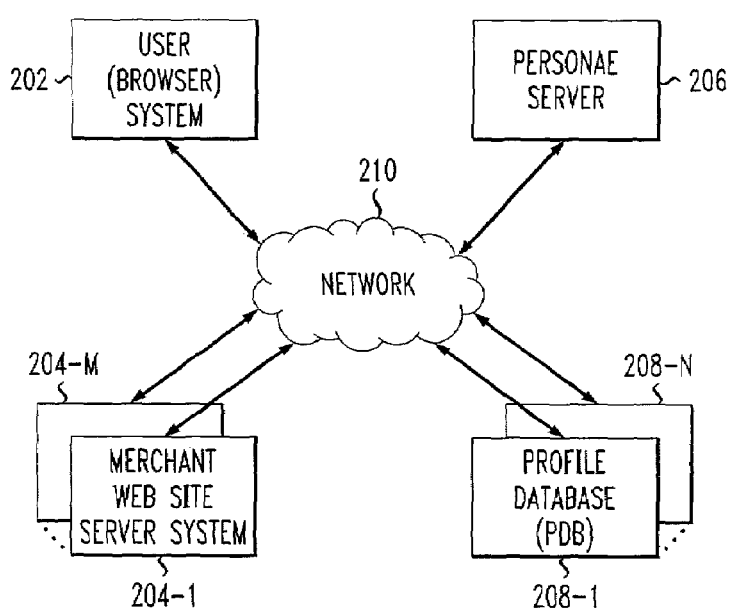
FIG. 2 is a block diagram illustrating an overview of an infrastructure according to an embodiment of the present invention.

As shown in FIG. 2, the infrastructure 200 of the invention comprises: a user computer system 202 which executes browser software; merchant web site server systems 204-1 through 204-M; a personae server 206; and profile databases (PDBs) 208-1 through 208-N. The components of the infrastructure 200 are operatively coupled via a network 210 which, in this embodiment, is the Internet.

The user computer system 202 is the computer system through which a user accesses the merchant web sites during his or her online shopping endeavors. It is also the computer system through which the user accesses the personae server 206 to request and specify parameters of various personae that he or she wishes to operate under while visiting various merchant web sites. An exemplary interface with the personae server 206 is described in the next section. It is to be understood that the user accesses these features through the browser software running on his or her system. One advantage of the infrastructure of the invention is that the browser software need not be modified to operate in the infrastructure. Further, it is to be understood that the privacy-preserving global customization techniques of the invention may be implemented within an existing network environment such as the Internet.

Each of the merchant web site server systems 204-1 through 204-M is a commerce server file system with which the user's computer system respectively communicates with while visiting the site. Each web site server system is configured with a GCE, as shown in FIG. 1. FIG. 2 illustrates M server systems, where M may be any number of web sites on the network which are configured to operate in accordance with the inventive infrastructure.

The personae server 206 resides in the network to support the management of user personae and the issuance of PACs. Each user who employs the inventive infrastructure holds an account at the personae server. This account allows the user to create new personae and manage policies for existing personae. Users must trust the personae server to accurately enforce the policies the user specifies for her personae, and to not disclose relationships between personae and users to merchants. In order to scale, in one implementation, the personae server may be a virtual server with one domain name. This name may be dynamically mapped to an actual personae server depending on a range of criteria, including the proximity of the server to the client, the current load and availability of servers, etc. Techniques for implementing virtual servers and the dynamic mapping of DNS (domain name system) queries to actual servers is well known in the art and, therefore, will not be described in further detail herein. One example of virtual server techniques that may be employed are those used by Akamai.

The profile databases, or PDBs, each may contain records inserted by merchant server systems 204-1 through 204-M (via their respective GCEs) about different personae. As shown, there may be numerous, unrelated PDBs in the infrastructure 200. N represents any number of PDBs which are desirable to support the abstractions of the invention. It is to be understood that there does not have to be, and likely is not, the same number of web site server systems 204 as there are PDBs 208. A merchant chooses the PDBs to which it inserts records as those it trusts to enforce the data protection policies that the merchant specifies. PDB support for merchant data protection will be described in detail below in Section IV. Users must trust the PDBs of the merchants to which it provides PACs to limit merchants to the forms of access specified in those PACs, as will be explained in detail below in Section III. However, since users may not be aware of the PDBs a merchant uses, this trust may need to be gained with, e.g., the assistance of an auditing body, examples of which were previously described.

It is to be understood that, as shown in FIG. 2, a user's personae server is separate from the merchant servers that the user visits, as well as from the profile databases the merchants use. Since the personae server stores the correspondences between personae and users, joining the persona server with profile databases may enable construction of a profile per user—as opposed to per persona. Thus, the personae server is preferably established as a privacy preserving site devoted to this purpose. PDBs may be offered by service providers, particularly as a value-added feature for commerce server hosting.

The type of data that merchants insert into PDBs is preferably limited to information about what a user acting under a particular persona did while at their web sites. In particular, the inserted data preferably excludes information that could be used to link two personae, such as the IP address from which the user visited or any other identifying information like an email address. Note that the decision to disallow multiple personae to be read by any merchant by default takes away incentive to do otherwise: a single merchant, even if in theory it could link two personae to the same user, is not given PACs to read data for both personae. This restriction on the type of data merchants insert thus primarily serves to prevent PDBs from linking personae associated with the same user.

The invention implements a protocol by which a merchant site requests a PAC for a persona from the personae server, the personae server issues that PAC, and the merchant uses it (via its GCE) to read or insert information about the persona to a PDB. This protocol is described in detail below. This protocol requires user input only in the case that there is no current persona for the user. The interface that the user experiences in this case is described in detail below in Section III.

III. Personae Management

As already discussed, personae are the basic tool by which users partition their behaviors into profiles. A main challenge to implementing personae is to enable the user to easily configure his or her personae with the desired policies for protecting his or her privacy, and in some cases to make policy decisions for the user so that managing personae is not a burden.

(a) Persona Configuration

The policies that describe how personae are managed and how PACs are distributed can significantly impact how a user's data is shared. Illustrative ones of these policies, and how they can be configured, are described below.

(i) Rights conveyed with PACs. As described in the previous section, a PAC granted to a merchant enables that merchant to access the information in a PDB associated with the persona named in this PAC. With one exception described below, by default, a PAC conveys "read" rights, which enable the merchant to read records in the PDB associated with the persona, and "insert" rights, which enable the merchant to insert new records about that persona. However, a user could grant only one of these to a merchant. For example, a user may grant a site only read access if the user does not want his or her activities at that site added to his or her profile associated with the particular selected persona. The user may grant only insert access if the user does not want the site he or she is visiting to learn his or her other profiled data, but the user is comfortable with that site adding data to the profile. A third type of access can be granted: "delete" rights, which enable the merchant to delete records associated with the persona from the PDB. Delete rights make it possible to set up a monitoring site that users can visit to review the information stored about their personae in a PDB and delete records of their choosing.

(ii) Exposure of multiple personae for the same user at one merchant. As previously discussed in Section I, granting PACs to a merchant with read rights for two different personae of the same user potentially enables the merchant to "merge" the personae profiles, even if the PACs are sent to that merchant in two different sessions. For this reason, it is preferred that a default policy be adopted that a merchant site be granted read rights to only one persona per user, namely, the first persona under which the user visits the site. This policy, however, may be limiting in certain cases. For example, many web sites may naturally be visited by the same user in different personae, such as search engines and portal sites that may serve as general "launch points" for content regardless of what type of content is sought. Allowing only one persona to be read by each of these sites may limit the amount of customization that site can perform.

(iii) Duration of a persona as a default. When a user selects a persona in which to browse, that persona preferably becomes the default, or "current," persona for some period of time, in order to minimize interruptions in the user's browsing experience. A configurable parameter of a persona is the length of this duration. The default setting for this parameter is the duration of the browsing session, i.e., until the user closes his or her browser. Other alternatives are a specified time period (e.g., 30 minutes), or simply to not make the persona a default at all. A persona, even if the default, can be changed by the user and will not be made readable to a site if that site previously was sent a PAC containing read rights for a different persona of the same user.

(iv) Duration of PACs. The duration for which a PAC (and the access rights it conveys) is valid can have significant ramifications to user privacy. On one end of the spectrum, a PAC granting read access that is valid indefinitely enables the site that receives it to monitor this persona arbitrarily far into the future. On the other end of the spectrum, a PAC may be limited for use only within a very tight time frame, perhaps only for a minute or so before it has to be renewed. Here, the tradeoff involves the additional overhead of frequent renewals, but the benefit to the user is fine-grained control over the duration for which he or she can be monitored (in the case of read access) or data about him or her can be added (in the case of insert access). In a preferred implementation, a short duration period for PACs by default is adopted, in order to better protect the user's privacy.

(b) PAC Format

Persona access credentials (PACs) are granted by a personae server to a merchant to enable the merchant to read, insert and/or delete records for this persona. In accordance with a preferred embodiment of the invention, a PAC is a structure containing the following fields:

1. An identifier for the merchant to which the PAC is being issued. This identifier is used by PDBs to verify that the merchant presenting a PAC is the same merchant to which that PAC was granted. This identifier is the public key that PDBs use to authenticate requests from the merchant. This public key must be conveyed to the personae server within a certificate that is appended to the PAC request and signed by a certification authority known to the personae server.

2. An expiration time. This time is calculated as a function of the PAC duration as described above in subsection (a).
3. Access rights. By default, these include both read and insert permissions, or only insert permission if this PAC is being issued to a merchant to which a PAC containing read permission for another persona of the same user was previously issued. However, it is possible that the user might choose a different configuration of access rights, possibly including the additional delete permission.
4. A digital signature on the above items. When a persona is created at the personae server, the server creates a new public key pair for the persona. That private key is used to sign all PACs for that persona.
5. The persona public key. The public key matching the private key used to sign the PAC is sent with the PAC. This public key serves as the long-term identifier for the persona.

A PDB verifies a PAC accompanying a merchant request by first verifying its signature using the public key contained in the PAC (i.e., the persona public key), and verifying that the PAC has not expired. It then compares the access rights granted in the PAC to the request that the merchant is making, to determine whether it should grant this request. If the request is allowed, the PDB performs the request on the data associated with the persona public key; i.e., this public key is used as the index for a persona's data. Note that the persona public key need not be certified in any way. If the merchant forges a PAC using a different public key, then it is merely posing queries to a nonexistent persona for that user.

In a preferred implementation, persona public keys may preferably be RSA keys (as described in R. L. Rivest et al., "A method for obtaining digital signatures and public-key cryptosystems," Communications of the ACM, 21(2):120–126, February 1978, the disclosure of which is incorporated by reference herein) with 1024-bit moduli.

(c) A User Interface

Figure 3A:
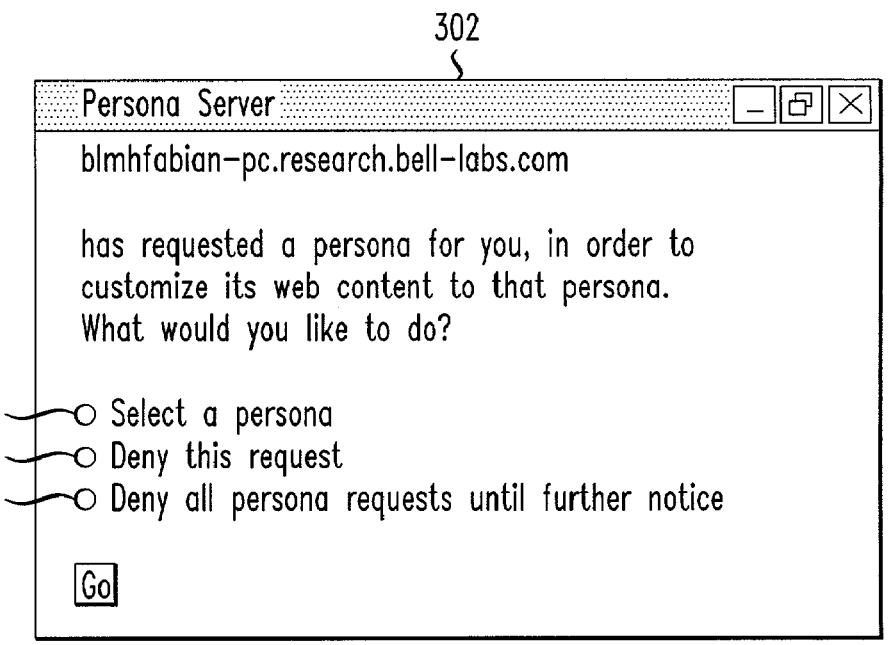
FIGS. 3A through 3D are diagrams illustrating portions of an interface a user may use to interact with a personae server according to an embodiment of the present invention.

In this subsection, some portions of an illustrative interface the user may use to interact with the personae server are shown. The personae server presents this interface to the user, via his or her computer display, when a merchant requests a persona and there is no current persona for the user at the personae server. When this happens, a new, smaller browsing window 302 is presented to the user, as shown in FIG. 3A. This offers the user three options from which to select by clicking thereon, namely, selecting a persona (304), denying this request for a persona (306), or denying all persona requests until further notice (308).

If the user chooses the second or third options (306 or 308), then this window immediately disappears. Note that in this case, the personae server need not know who the user is, and the user need not even have an account with the personae server. In this case, however, choosing the third option (308) denies all persona requests for anyone using this browser, rather than only for this user. So, the user who does not want to be bothered with personae management can disable the system easily. If the user chooses to deny all personae requests until further notice (308), then the user must visit a URL (uniform resource locator) at the personae server in order to re-enable persona requests to his or her browser.

Figure 3B:
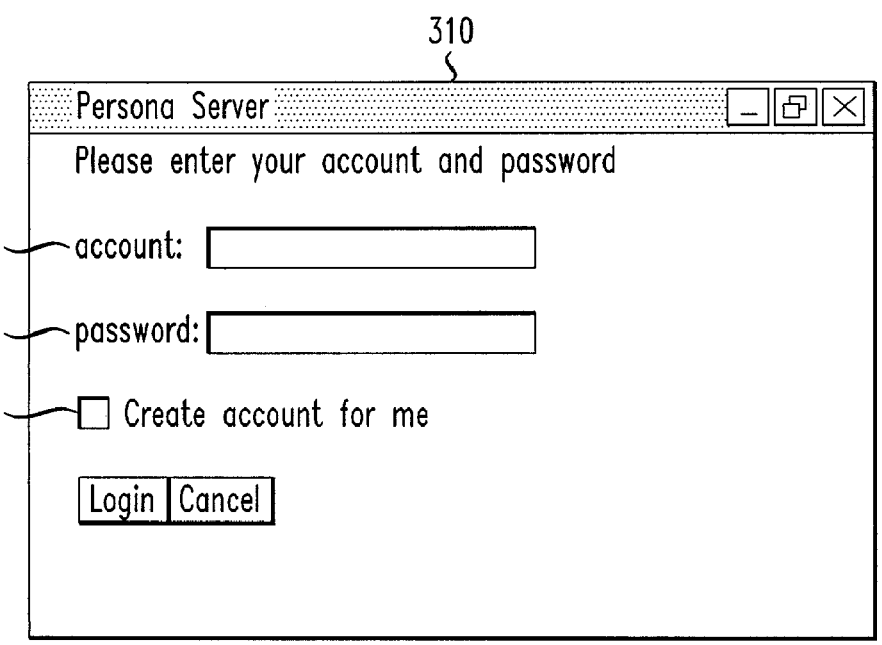

If the user chooses the first option (304) and has not previously logged in during this browsing session, the user proceeds to a login screen 310 shown in FIG. 3B. If the user does not already have an account at the personae server, he or she can create one by checking the appropriate box (312).

Otherwise, the user simply logs in by entering his or her account number (314) and password (316), without checking the box.

Figure 3C:
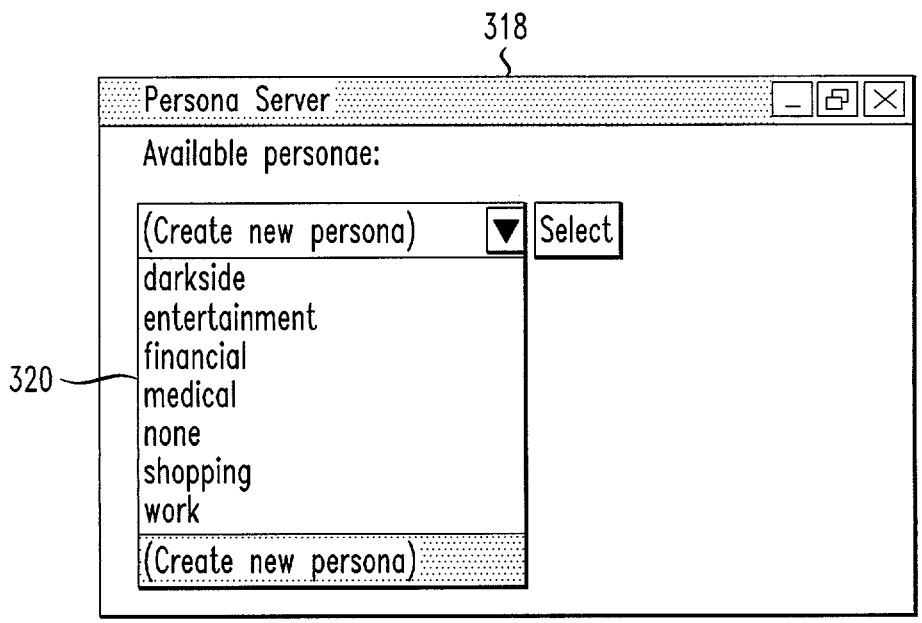
Figure 3D:
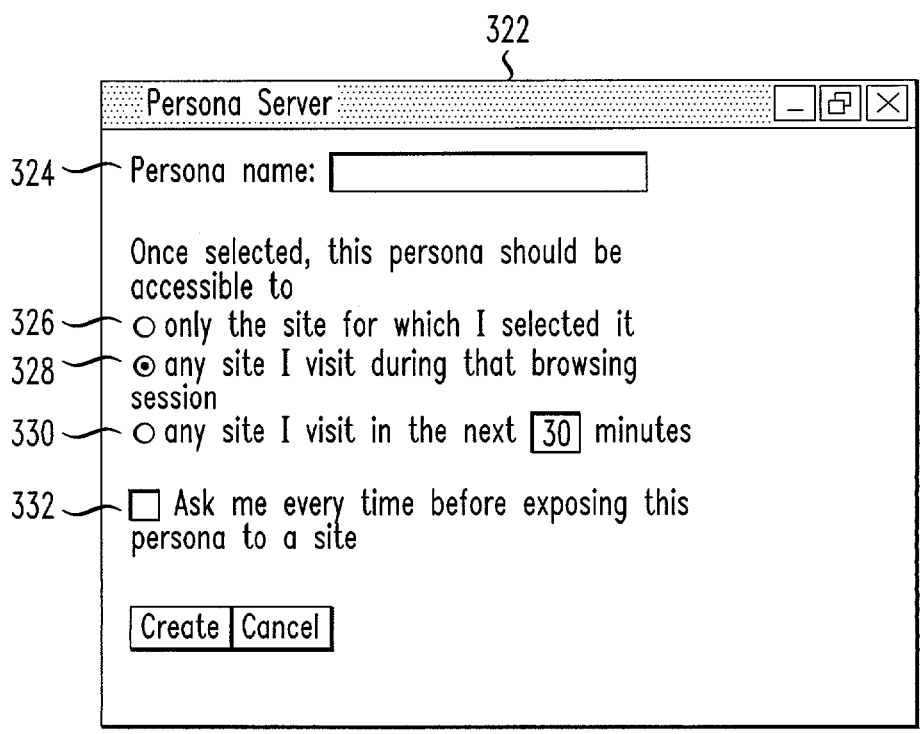

After logging in, the user can create new personae or select an already-existing one. This may be done in accordance with screen 318 and persona creation/selection menu 320, as shown in FIG. 3C. If the user selects an already-existing persona, then this window now disappears and a PAC for that persona is issued to the merchant. If the user chooses to create a new persona, then the screen 322 shown in FIG. 3D appears. This allows the user to choose a name for the persona (324) and configure some basic parameters for the persona. For example, the user may specify that, once selected, the persona should be accessible to: only the site for which the user selected it (326); any site the user visits during a browsing session (328); or any site the user visits in the next n minutes (330), where n is also selectable. The user may also specify that he or she be asked every time before exposing this particular persona to a site (332).

It is to be understood that there may be other screens (not shown) associated with the personae server that include interfaces to modify other parameters of personae (as described above in subsection (a)), and interfaces for disabling or changing current personae.

(d) A PAC Request Protocol

Figure 4:
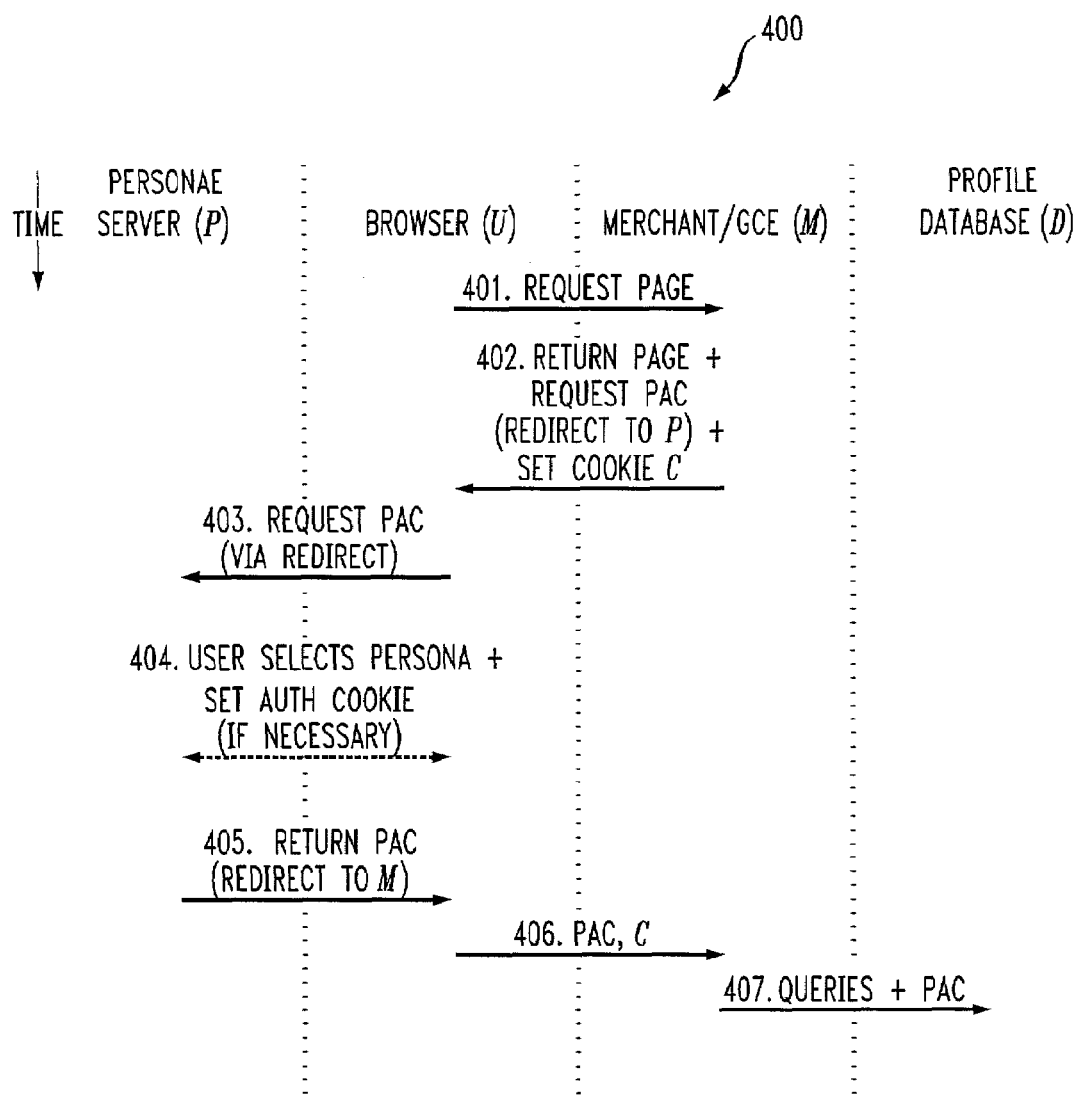
FIG. 4 is a flow diagram illustrating a persona access credentials (PAC) request protocol according to an embodiment of the present invention.

Referring now to FIG. 4, in accordance with the present invention, an illustrative protocol is shown by which a merchant site M requests a PAC for a persona from the personae server P, P issues that PAC, and Muses it (via its GCE) to read or insert information about the persona to a PDB D. It is to be understood that, with reference to FIG. 2, the merchant site M represents a merchant site server system 204, the personae server P represents personae server 206, and PDB D represents a PDB 208.

The protocol begins by the user directing his or her browser U to the merchant site as usual (step 401). It is to be understood that U represents user system 202 in FIG. 2. At any point in M's interaction with U, M may redirect U to a well-known CGI script on the personae server P (step 402). This redirection need not preclude the merchant from presenting a page to the user; e.g., the redirection may be in a hidden frame in the user's browser. Appended to this URL are arguments including a URL at site M to where the PAC is to be sent. For example, an HTTP redirection message may be used. Moreover, in the HTTP headers of this redirection message, M sets a cookie at U that includes a customer identifier C. So, C will be returned to the server on each subsequent communication from U.

The message sent in step 402 prompts U to automatically issue a request to P for this URL (step 403). If U has not authenticated to P recently or does not have a persona already selected for this browsing session, P responds to the user with a new window indicating that M is requesting a persona for the user, and enabling the user to log in and select one (step 404) as illustrated above in the context of FIGS. 3A through 3D. Moreover, P queries the user only if the request in step 403 is accompanied by an HTTP cookie (not shown) indicating that a user previously enrolled this browser to respond to persona requests and has not since disabled them. In this sense, the illustrative technique is an "opt-in" technique. Once a persona is selected, P generates a PAC for M, according to the persona that the user selected, and redirects U to the return URL on site M with PAC appended (step 405). Along with step 404, P can set a cookie at U so that this login and selection procedure need not be repeated for each site. For example, if this cookie is set to be in effect for the duration of this browsing session, then this typically will be the last time the user will have to go through this persona selection process during this browser session.

The message sent in step 405 causes U to forward the PAC to M, accompanied by the customer identifier C that M previously set as a cookie at U(step 406). M can forward this pair to its local GCE (as illustrated above in the context of FIG. 1) and then pose queries about customer C, which the GCE translates into queries to D with PAC appended to show that M is authorized to make such queries (step 407).

When the user visits another merchant, that merchant may request a persona using the same protocol. In this case, the entire protocol above is executed transparently to the user, i.e., step 404 is skipped.

IV. Data Sharing Among Merchants

Data sharing among merchants takes place by merchants inserting records into, and reading records from, a PDB via their respective GCEs. For the purposes of this section, we denote the merchant who inserted the record a by merchant (a), and the persona (i.e., the persona public key, as mentioned above in section III(a)) to which the record pertains as persona(a). For ease of explanation, we do not distinguish between the merchant site and its GCE in this section.

Just as users have privacy concerns that must be addressed in the inventive infrastructure, so do merchants. Specifically, a merchant may not want to insert records into the PDB if a competing merchant can use this information, directly or indirectly, to tailor content to the same user if that user happens to visit the competing merchant. Thus, for the infrastructure of the invention to be adopted by merchants, it is important that mechanisms be provided to protect the information that they insert into the system.

(a) A Tainting Data Protection Model

The data protection model provided by the invention for this task is based on information flow models, specifically tainting. Intuitively, one datum in the system taints another if the value of the second was influenced by the value of the first. A tainting model enforces the policy that if a taints a', then a' can be used only in ways that a has been authorized to be used. So, for example, if the owner of a specified that it not be disclosed, then a' cannot be disclosed either. The general idea for using tainting to protect merchant data in the inventive infrastructure is that for each record a that a merchant inserts into the PDB, the merchant specifies sets of other merchants to which it will allow that record, or anything that record taints, to flow. So, for example, if a merchant reads a and uses it to customize pages for a user, and then the merchant inserts a record a' based on the user's subsequent behavior (e.g., perhaps the user bought what the merchant displayed), then a' can be read only by merchants that the merchant who wrote a allows it to.

However, this general model is preferably refined. A primary reason is that if a data item taints records arbitrarily far in the future by default, this will prevent much data sharing among merchants, usually unnecessarily. For example, consider the scenario outlined above in which a user purchases travel to Egypt and consequently is offered, and buys, books about pyramids from an online bookstore. Now suppose the user visits an online home furnishings store, which offers the user a reading lamp because it learns of the user's interest in reading from the records inserted by the book store. In this example, it would typically be unnecessary that records inserted by the home furnishings store, indicating the purchase of a reading lamp, be withheld from other travel stores that the user visits merely because records inserted by the first travel store are contained in their causal history.

We therefore enrich the model by requiring a merchant to specify taint classes for each record a that it inserts. Abstractly, the merchant specifies a sequence of sets $CLASS_a[0], CLASS_a[1], \ldots, CLASS_a[STR(a)+1]$, where each $CLASS_a[i]$ is a subset of merchants, $CLASS_a[i] \subseteq CLASS_a[i+1]$, $CLASS_a[STR(a)+1]$ is the universe of all merchants, and STR(a) is a nonnegative integer called the taint strength of a. Intuitively, if merchant m is not a member of $CLASS_a[i]$, then it is not allowed to read records that were derived from a by a sequence of i or fewer derivations. More precisely, suppose we define a relation →as follows:

a→a' if and only if $$\text{merchant}(a) \neq \text{merchant}(a') \land \qquad (1)$$

$$\text{persona}(a) = \text{persona}(a') \land \qquad (2)$$

$$\text{merchant (a) read a' before inserting a} \qquad (3)$$

Now consider the directed acyclic graph formed by the → relation, i.e., where nodes are records and edges correspond to the → relation. For records a, a' and merchant m, if $m \notin CLASS_a(i)$ and there is a path of length i or less from a' to a, then m cannot read a'.

A merchant makes use of this model by specifying sets of merchants when it registers with a PDB and then referring to those sets to construct the taint classes for records it inserts. For example, a merchant may designate a set $M_{partners}$ of partner merchants with whom it is willing to share data generously, and a set $M_{noncompetitors}$ of merchants that are neither partners nor competitors. Then, when it inserts a record a, the merchant might specify STR(a)=1, $CLASS_a[0] = M_{partners}$ and $CLASS_a[1] = M_{partners} \cup M_{noncompetitors}$. That is, only partners can read record a, and only partners and noncompetitors can read records a'→a (and only if merchant (a') consents). In particular, competitors of merchant(a) can read neither.

An algorithm to enforce the policy expressed by taint classes is as follows. Stored with each record a is a data structure 500, as illustrated in FIG. 5, which includes: (i) an integer value (502) called the accumulated taint strength of a, denoted ATS(a); (ii) the sets (504) $CLASS_a[1], \ldots, CLASS_a[STR(a)]$; and (iii) pointers (506) to the records a' such that a→a'. In addition, the data structure 500 also includes customization information (508) for the data record, e.g., "Egypt," and a taint strength value (510) STR (STR being an integer). When a record a is inserted, the accumulated taint strength is computed as:

$$ATS(a) = \max\left\{STR(a), \max_{a':a \to a'} \{ATS(a')\} - 1\right\}$$

To determine whether a merchant m can read a, the PDB executes a breadth-first search from a in the graph defined by →, truncating each descending traversal once when it encounters a record a' where ATS(a') is less than the current depth in the search. For each record a' visited at depth d in this traversal, m is allowed to read a only if $m \in CLASS_a[d]$. A main result of this algorithm is:

If $m \notin CLASS_a[i]$ and there is a path of length i or less from a' to a, then m cannot read a'.

To insert a record a with out-degree B (i.e., there are B records a' such that a→a'), the computation required is O(B). Determining whether a merchant can read a record takes O(E(log R+log M)) time if there are a total of M merchants, R records for this persona, and E edges among these records. However, the computation time is much less for reasonable taint strengths. In particular, if a maximum taint strength per record were imposed, then the breadth-first traversal will stop by the depth of that strength. As described above, it is assumed that the sets comprising the taint classes for a record are previously specified sets that categorize merchants relative to the inserting merchant. In this case, a record a requires storage of only O(B+C) pointers over and above the (one-time) storage of these merchant categories if there are C merchant categories.

In accordance with this inventive approach, a merchant can change taint classes for a record even after inserting that record. However, to support changes that increase the taint strength of the record, each record a stores pointers to all records a' such that a'→a. Then, if the merchant changed the taint classes of a record a in a way that increases STR(a), the PDB recomputes ATS(a) and performs a depth-first traversal to depth ATS(a) on the DAG defined on the inverse of →, starting at a. For each node a' visited in this traversal, ATS(a') is updated if necessary.

Alternatively, to improve efficiency and minimize unnecessary tainting even further, the tainting model of the invention may "expire" taint over time. One such alternative is, when a merchant inserts a record a, to record pointers a→a' only to a fixed number of records a' most recently read by merchant(a). In this way, a record a' will eventually no longer taint records written by a merchant, if the merchant does not read a' again.

(b) Reading Records

The records that a merchant reads is a primary factor in determining the taint properties of records that merchant inserts, see clause (3) in the relation defined above in subsection (a). In order to minimize unnecessary tainting, it is important that merchants read only records that are directly relevant to the customization decisions they make. The present invention thus provides a read interface for the PDB that makes it possible for merchants to be very targeted in the records they read.

The PDB interface for reading records supports two types of operations. These operations are respectively illustrated in FIGS. 6A and 6B. The first operation 602, here called create_list, takes as its arguments a PAC and a scoring function specified by the merchant. The scoring function $f$ accepts as input a single record and returns a floating point value, called a score. Intuitively, for a record a, the score $f(a)$ indicates a's relevance to the customization decision that the merchant must make, as determined by the scoring function $f$. For example, a reasonable scoring function might return higher scores for more recent records, records that indicate large purchases by the visitor, or records that match the merchant's inventory well. In an illustrative implementation, the scoring function is a Java class file that the merchant administrators craft, and that is required to implement a function with no side effects (i.e., no network communication, disk accesses, etc.).

The create_list operation applies the scoring function $f$ to all records to which the merchant has access for the persona indicated by the PAC. The return value from create_list (PAC,$f$) is a reference L to a linked list of records sorted by descending scores, stored at the PDB. Importantly, invoking the operation create_list does not "count" as reading records, since the reference L that it returns does not indicate information about the content of records, their scores, or even how many records are in the resulting linked list stored at the PDB.

The only operation available to the merchant using the reference L is to invoke next(L). This operation, denoted as 604 in FIG. 6B, initially returns the record at the head of the list, and when successively invoked it returns the next record in the linked list. Each record returned to the merchant is marked as having been read by the merchant, for the purpose of determining the records a such that a'→a for the records a' the merchant inserts. The merchant can sample the first few records of L to determine whether they suit the merchant's needs. If so, these can be used to customize content for the visitor. If not, the merchant site may form a new list by invoking create_list with a different scoring function. This interface requires the merchant to read very few records per visitor in order to customize its content, thereby limiting unnecessary tainting.

(c) On Accessing Multiple PDBs

As described in section II above, the inventive infrastructure allows multiple PDBs, and further allows a single merchant to subscribe to multiple PDBs as it chooses. It is thus possible that a record at one PDB will be tainted by a record at another PDB. More precisely, when inserting a record a to a PDB D, the merchant's GCE propagates to D a reference to each record a' at another PDB such that a→a'. The graph traversals in the algorithms of subsection (a) above may then require communication across PDBs to complete. If a needed PDB is unreachable, the algorithms can respond conservatively: e.g., in the case of determining whether a merchant can read a record, if the PDB at which a necessary record a' resides is unavailable, then the merchant is disallowed.

We note that placing responsibility on merchant GCEs to propagate this taint information poses minimal risk to the enforcement of tainting policies. First, there is little motivation for a merchant writing a record a' to suppress the fact that a'→a; doing so merely decreases the degree to which a' is tainted. Second, the fact that merchant(a') read a means that merchant(a')∈$CLASS_a$[0]. That is, merchant(a) already trusts merchant(a') with a, and so trusting merchant(a') to propagate the fact that a'→a extends this trust minimally. Third, since the PDB storing a maintains the time at which a was read, and the PDB storing a' similarly records the time at which a' was inserted, such suppression is readily detected in an audit involving both PDBs. Thus, communicating records outside the infrastructure is a less risky approach to violating the inventive tainting model, consistent with the advantages described above in section I.

(d) Merchant Taint Class Configuration

The tainting model described above gives each merchant fine-grained control over where its records, and information derived from them, flow. The merchant m exercises this control by specifying taint classes on each record it writes, which for convenience will usually be composed of sets of merchants that m previously defined—e.g., the $M_{partners}$ and $M_{noncompetitors}$ described above. In this subsection, we describe a configuration interface by which m can define such sets of merchants at a PDB.

Figure 7:
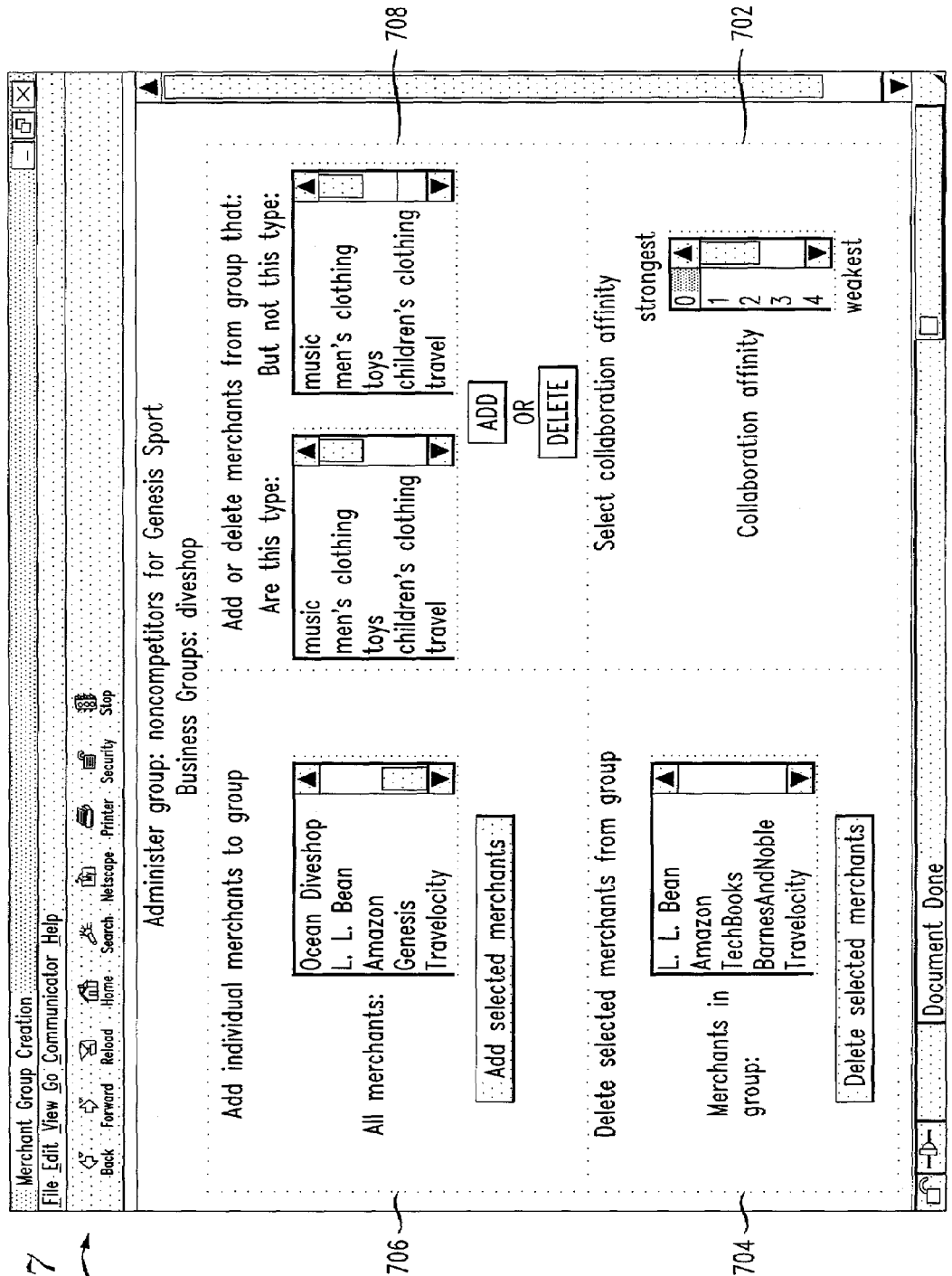
FIG. 7 is a diagram illustrating portions of a configuration interface by which a merchant may define sets of merchants at a profile database according to an embodiment of the present invention.

A portion of this interface is shown in FIG. 7. In this figure, the merchant "Genesis Sport" is configuring a group that it calls "noncompetitors," as indicated in the heading of the page. Shown in the lower right screen quadrant 702 is the taint class (here called a more user-friendly name, "collaboration affinity") in which the merchants in this group are included by default when Genesis Sport writes a record to this PDB. As shown, Genesis Sport by default gives its noncompetitors immediate access to the records it writes, as indicated by specifying a taint class of 0 for them. The noncompetitors of Genesis are listed in the lower left screen quadrant 704. For example, Genesis includes book stores in its list of noncompetitors, but does not include "Ocean Diveshop."

The upper two screen quadrants make the task of formulating the noncompetitors list easier for Genesis. The upper left screen quadrant 706 contains a list of all merchants registered to use this PDB. Genesis can select individual merchants to add to its list. In addition, Genesis can choose categories of merchants to include or exclude from its list using the upper right screen quadrant 708. The category of a merchant is specified by the merchant when it is registered to use this PDB (Genesis itself is a diving store, as indicated in the "Business groups" heading of the page). Since this categorization may not be entirely reliable, adding a category of merchants simply lists the new merchants in the lower left screen quadrant 704. Genesis can then inspect the merchants that were added, before committing these additions to its noncompetitors list.

V. Illustrative Applications

It is to be appreciated that the design of the illustrative implementation of the infrastructure of the invention was influenced by a focus on the business-to-consumer market. For example, this is manifested in that the invention operates with unmodified client browsers (e.g., Netscape, Internet Explorer, etc.) where it is known that relying on user installation of new software can be a barrier to adoption. It is also manifested in the attention given to user privacy. However, the principles of the invention may be applied in certain business-to-business (B2B) settings, as well.

One application of our design in B2B settings is in so-called "ScenarioNets," which is a model of interaction to which some B2B e-markets are evolving. Seybold et al. (in Seybold et al. "Understanding the B2B and E-Market Landscape," Customer.com Focused Research Collection, Patricia Seybold Group, Inc., 2000, the disclosure of which is incorporated by reference herein, at pg. 36–39) define a ScenarioNet to be a customer- and project-specific set of interrelated tasks that can be performed across web sites and suppliers to accomplish a specific outcome. The importance of "customer- and project-specific" is that the sequence of interrelated tasks may be so customized to the customer and project that it is not anticipated or directly supported by a vertical or horizontal e-market. Seybold et al. suggest supporting ScenarioNets by providing a way for the customer to carry the context of previously completed tasks from one web site to the next, so that already-entered information and results of already-completed tasks are available to the next sites and applications in the sequence. The infrastructure of the invention can support ScenarioNets in this way, where the user employs a persona per sequence of tasks. The inventive infrastructure provides both the techniques for context to be carried from one step to the next and mechanisms to protect the sensitive information of both the user and web sites involved in the sequence of tasks. And, in contrast to the support offered by GroupWare systems, the inventive infrastructure need not be configured with advanced knowledge of the sequence of related tasks.

Since certain B2B settings may be more amenable to the introduction of custom client software, in one embodiment, the client software may embody the persona server for this user, or even the PDB contents themselves. However, the latter organization would centralize all data in a way that reveals a single profile for the user if this centralized store were compromised.

VI. Exemplary Computer System Architecture

Figure 8:
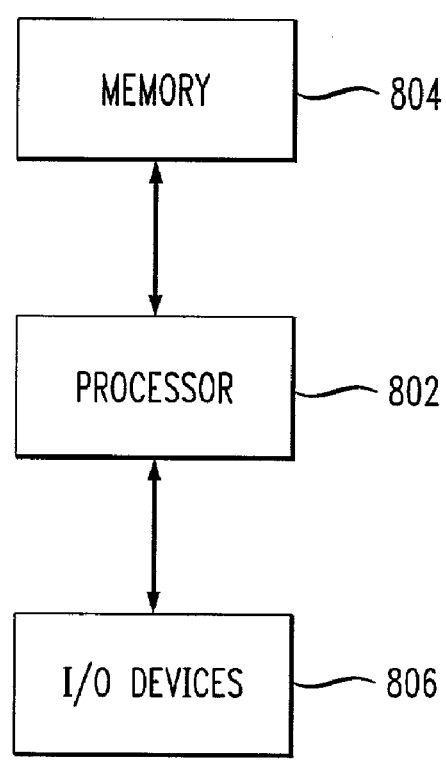
FIG. 8 is a block diagram illustrating an exemplary architecture of each of the computer systems operating in the infrastructure shown in FIG. 2.

Referring now to FIG. 8, an exemplary architecture is illustrated for each computer system communicating over the network. Thus, it is to be understood that the exemplary architecture in FIG. 8 may represent the architecture of each of the computer systems operating in the infrastructure shown in FIG. 2, i.e., the user computer system 202, the merchant web site server systems 204-1 through 204-M, the personae server 206, and the PDBs 208-1 through 208-N. As mentioned, the personae server may be a virtual server. Also, each merchant server file system and/or PDB may include one or more such computer systems.

As shown, each computer system may comprise a processor 802, memory 804, and I/O devices 806. It should be understood that the term "processor" as used herein may include one or more processing devices, including a central processing unit (CPU) or other processing circuitry. Also, the term "memory" as used herein is intended to include memory associated with a processor or CPU, such as RAM, ROM, a fixed memory device (e.g., hard drive), or a removable memory device (e.g., diskette or CDROM). In addition, the term "I/O devices" as used herein is intended to include one or more input devices (e.g., keyboard, mouse) for inputting data to the processing unit, as well as one or more output devices (e.g., CRT display) for providing results associated with the processing unit. Accordingly, software program instructions or code for performing all or portions of the methodologies of the invention, described herein, may be stored in one or more of the associated memory devices, e.g., ROM, fixed or removable memory, and, when ready to be utilized, loaded into RAM and executed by the CPU.

Accordingly, as described above in detail, the present invention provides techniques and infrastructure for supporting global customization. The invention enables persona profiles of user information to be maintained, and such persona profiles to be accessed by merchants. Via the persona abstraction, users control what information is grouped into a persona profile, and can selectively enable a merchant to read one of these profiles. The infrastructure of the invention employs a persona server that assists users in managing their personae. The infrastructure of the invention separates this from the profile databases at which persona profile information is stored, to eliminate any single point at which different persona profiles can be tied to the same user. Since merchants also have privacy concerns, the infrastructure of the invention provides a data protection model based on tainting, by which merchants can limit how the information they contribute can be exposed.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for use in a distributed data network wherein a user may request and receive content from one or more entities in the distributed data network, the method comprising the steps of:

providing one or more mechanisms for enabling at least one of the user and one or more of the entities to control which entities in the distributed data network have access to information generated in association with the user's activity on the distributed data network, wherein the user specifies at least one role and, based on the created role, at least one profile for the user is maintained by one or more of the entities in the form of information inserted into the profile by one or more of the entities, the information representing the user's activity on the distributed data network with respect to the one or more entities that inserted the information, such that profile maintenance is substantially transparent to the user; and customizing content to be received by the user in accordance with at least a portion of the information in the user profile;

wherein the step of providing the one or more control mechanisms for the user comprises the step of enabling the user to specify two or more roles within which the user may perform activities on the distributed data network, wherein the two or more roles have two or more profiles respectively associated therewith, and wherein the two or more profiles are substantially unlinkable.

2. The method of claim 1, wherein the substantial unlinkability of the profiles substantially prevents an entity from learning about the user's activity at another entity, when the user conducts activities at the different entities in the different roles.

3. The method of claim 1, wherein the roles are specified in accordance with at least one dedicated server located in the distributed data network.

4. The method of claim 1, wherein at least one of the one or more entities are merchants operating on the distributed data network.

5. A method for use in a distributed data network wherein a user may request and receive content from one or more entities in the distributed data network, the method comprising the steps of:

providing one or more mechanisms for enabling at least one of the user and one or more of the entities to control which entities in the distributed data network have access to information generated in association with the user's activity on the distributed data network, wherein the user specifies at least one role and, based on the created role, at least one profile for the user is maintained by one or more of the entities in the form of information inserted into the profile by one or more of the entities, the information representing the user's activity on the distributed data network with respect to the one or more entities that inserted the information, such that profile maintenance is substantially transparent to the user; and customizing content to be received by the user in accordance with at least a portion of the information in the user profile;

wherein the step of providing the one or more control mechanisms for the one or more entities comprises the step of enabling the one or more entities to specify which other entities are able to access information that the one or more entities learned in association with the user conducting activities with the one or more entities.

6. The method of claim 5, further wherein the one or more entities are enabled to specify which other entities are able to access information derived from original information that the one or more entities learned in association with the user conducting activities with the one or more entities.

7. The method of claim 6, wherein the one or more entities are enabled to specify a degree of information derivation in accordance with which other entities may be able to access the information.

8. The method of claim 7, wherein the one or more entities are enabled to group the other entities into one or more classes wherein each class has a degree of information derivation associated therewith.

9. The method of claim 1, wherein the one or more entities access the information in accordance with one or more dedicated databases located in the distributed data network.

10. The method of claim 8, wherein the information that the one or more entities learn in association with the user conducting activities with the one or more entities comprises at least one of original information and information derived from the original information.

11. The method of claim 8, wherein the enabling step further comprises enabling the one or more entities to specify one or more taint classes for portions of the stored information.

12. The method of claim 11, wherein a given taint class corresponds to an affinity an entity has to collaborate with entities in the given taint class.

13. The method of claim 11, wherein at least portions of the information are respectively stored as records, wherein each record has stored in association therewith a data structure comprising at least one of an accumulated taint strength, a set of taint classes, and pointers to one or more original records from which this record was derived.

14. The method of claim 13, wherein an entity is not permitted to read a record derived from an original record if the entity is not a member of a specified taint class and there is a path of a given length or less from the derived record to the original record.

15. The method of claim 8, further comprising the step of applying a scoring function to portions of the stored information to which a given entity has access.

16. The method of claim 15, wherein results of the scoring function indicate the relevance of the portions of the stored information to one or more content customization decisions to be made by the given entity.

* * * * *